United States Patent [19]
Hart et al.

[11] Patent Number: 6,089,409
[45] Date of Patent: Jul. 18, 2000

[54] BEVERAGE SERVER

[75] Inventors: Burton L. Hart, Auburn; John T. Knepler, Springfield, both of Ill.

[73] Assignee: Bunn-O-Matic Corporation, Springfield, Ill.

[21] Appl. No.: 09/057,463

[22] Filed: Apr. 9, 1998

Related U.S. Application Data

[60] Provisional application No. 60/044,627, Apr. 18, 1997.

[51] Int. Cl.[7] ............................. B67D 5/62; G04C 23/00; A47J 31/00
[52] U.S. Cl. ..................... 222/146.5; 222/641; 222/644; 99/281; 99/299; 99/304
[58] Field of Search ................................ 222/54, 146.5, 222/638, 639, 640, 641, 644, 146.2, 154, 155; 99/280, 282, 283, 299, 300, 304, 305, 306, 307, 281

[56] References Cited

U.S. PATENT DOCUMENTS

| | | |
|---|---|---|
| Re. 25,663 | 10/1964 | Bunn . |
| 3,034,417 | 5/1962 | Bunn . |
| 4,621,571 | 11/1986 | Roberts ...................................... 99/280 |
| 5,161,455 | 11/1992 | Anson et al. . |
| 5,239,519 | 8/1993 | Nelson et al. ............................. 99/280 |
| 5,245,914 | 9/1993 | Vitous ....................................... 99/280 |
| 5,417,145 | 5/1995 | Joseph, Jr. et al. ....................... 99/280 |
| 5,907,993 | 6/1999 | Van Camp et al. ....................... 99/280 |

*Primary Examiner*—Kevin Shaver
*Assistant Examiner*—Keats Quinalty
*Attorney, Agent, or Firm*—Trexler, Bushnell, Giangiorgi & Blackstone, Ltd.

[57] ABSTRACT

Beverage servers for retaining beverages at a desired heated temperature. Prior art beverage servers have attempted to maintain the temperature of a brewed beverage retained therein in a variety of ways. One form of beverage server utilizes a heat resistant and heat conductive material for a beverage reservoir and places an exposed flame using a product such as gelled fuel thereunder to provide heat. One problem with this type of beverage server is that an exposed flame is presented to the customers and that the flame does not necessarily maintain a consistent or desired beverage temperature.

23 Claims, 6 Drawing Sheets

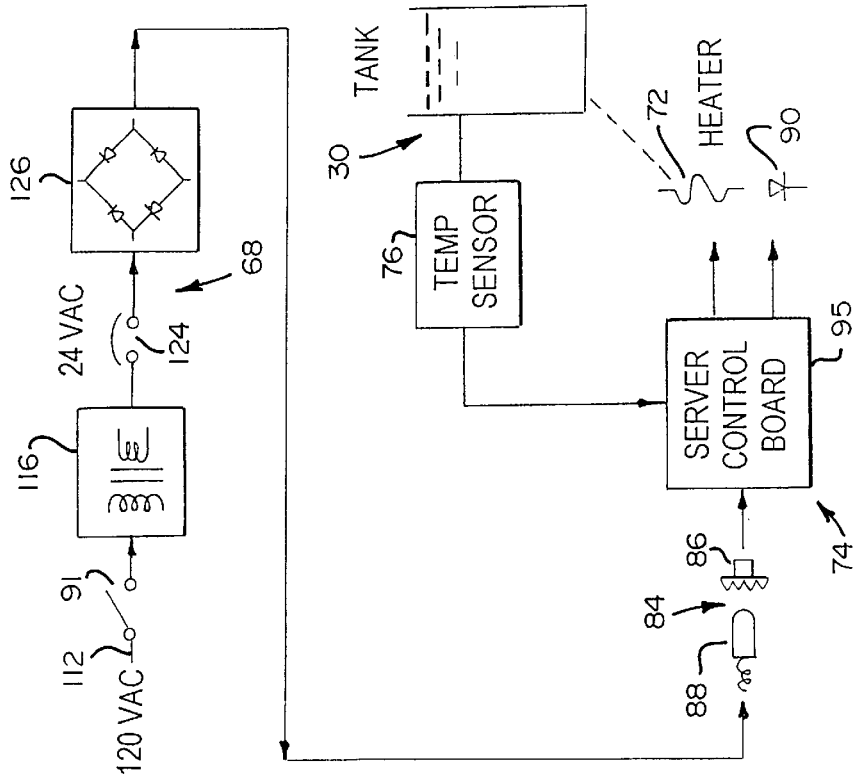
FIG. 8
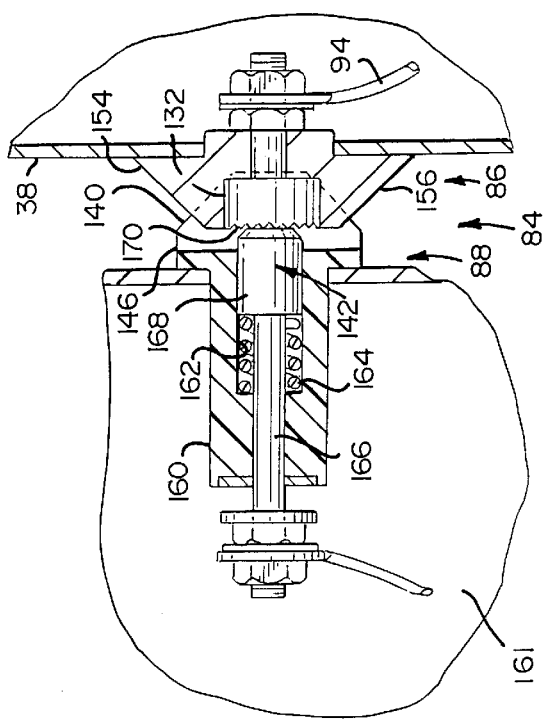
FIG. 6
FIG. 7

BEVERAGE SERVER

CROSS REFERENCE

This patent application claims the benefit of domestic priority of co-pending U.S. Provisional Application Ser. No. 60/044,627, filed Apr. 18, 1997.

BACKGROUND

The present invention relates to beverage servers for retaining beverages at a desired heated temperature.

Prior art beverage servers have attempted to maintain the temperature of a brewed beverage retained therein in a variety of ways. One form of beverage server utilizes a heat resistant and heat conductive material for a beverage reservoir and places an exposed flame using a product such as gelled fuel thereunder to provide heat. One problem with this type of beverage server is that an exposed flame is presented to the customers and that the flame does not necessarily maintain a consistent or desired beverage temperature.

Another form of beverage dispenser which provides heat to a server is a warmer plate type device. The server is constructed of a material which will conduct heat from a warmer plate positioned therebelow. Heat is produced by the warmer plate, generally at a consistent power level. Typically, a glass, metal or ceramic reservoir is required in order to conduct heat to the beverage retained therein. This type of server provides heat to the beverage retained therein but also places an active heating element in a position which may be accessible to a user. Such an active heating element exposed to customers may be less than optimal.

Another way in which the prior art has attempted to maintain a brewed beverage in a heated condition and to present the beverage in a server for use by a consumer is the use of glass-insulated reservoirs and air pots. The glass insulated reservoirs provide temperature retention and may be heated by a warming device as discussed above. However, such glass reservoirs are subject to damage upon impact. As such, it would be preferable to provide a non-breakable reservoir structure for such beverage servers especially because they are presented to customers for use and such consumers may be less than careful in using such servers.

The air pots mentioned above help to slow the loss of heat from beverage servers but generally are not used with an active heat maintaining system. Air pots typically use a glass reservoir and are subject to the problems discussed hereinabove with regard to glass reservoirs. Further, the air pots use a pressurization system in order to drive coffee through a dispensing tube in the reservoir. As such, atmospheres are actively and intentionally introduced into the air pot reservoir. Generally, it is desirable to minimize the contact of atmosphere with coffee retained in a reservoir in order to improve and extend the flavor qualities of the coffee. Contact and exposure to air tend to reduce the flavor characteristics and degrade the coffee. As such, air pots actively introducing such air may tend to accelerate the flavor degradation.

As an additional matter, the prior art servers tend to quickly reduce the temperature of coffee when coffee is initially dispensed into a cool or unheated reservoir. As might be expected, heat from the coffee is conducted to the surrounding walls of the reservoir which thereby reduces the temperature of the beverage and reduces the time for retaining the beverage. While some reservoirs provide instructions to the food preparation employee to preheat a reservoir with heated water, the food preparation employees may forget or fail to preheat the reservoirs thereby creating the problems associated with cold reservoirs.

Finally, as might be expected with other foods, coffee as well as other brewed beverages have a "life" during which the flavor characteristics are optimal. Freshly brewed coffee, for example, sitting in an open pot will have a "life" of approximately 20–30 minutes. The life is extended by reducing the evaporative loss of the coffee, minimizing the atmospheric contact with the coffee, regulating the temperature conducted to the coffee to maintain the coffee at a desired serving temperature, preventing overcooking of the coffee, and maintaining the temperature at a desired temperature range. However, prior art devices tend to expose the coffee to the atmosphere, fail to regulate the temperature of the heat provided to maintain the coffee in a heated condition, and tend to "cook" the coffee such as by leaving the coffee on an unregulated warmer.

For the foregoing reasons, as well as other reasons which may not have been discussed hereinabove, there is a need for an improved beverage server which may be presented to customers for self-dispensing.

BRIEF DESCRIPTION OF THE DRAWINGS

The organization and manner of the structure and function of the invention, together with the further objects and advantages thereof, may be understood by reference to the following description taken in connection with the accompanying drawings, wherein like reference numerals identify like elements, and in which:

FIG. 6 is an enlarged, top plan view of a server power contact engaged with a power station contact to provide electrical energy from the power station to the server to operate a heater positioned in the server;

FIG. 7 is an enlarged, partial fragmentary, cross-sectional side elevational view taken along line 7—7 in FIG. 6 showing the structure of the contact assembly;

FIG. 8 is a diagrammatic illustration of the circuit of the server power station and server.

DESCRIPTION

Figure 1:
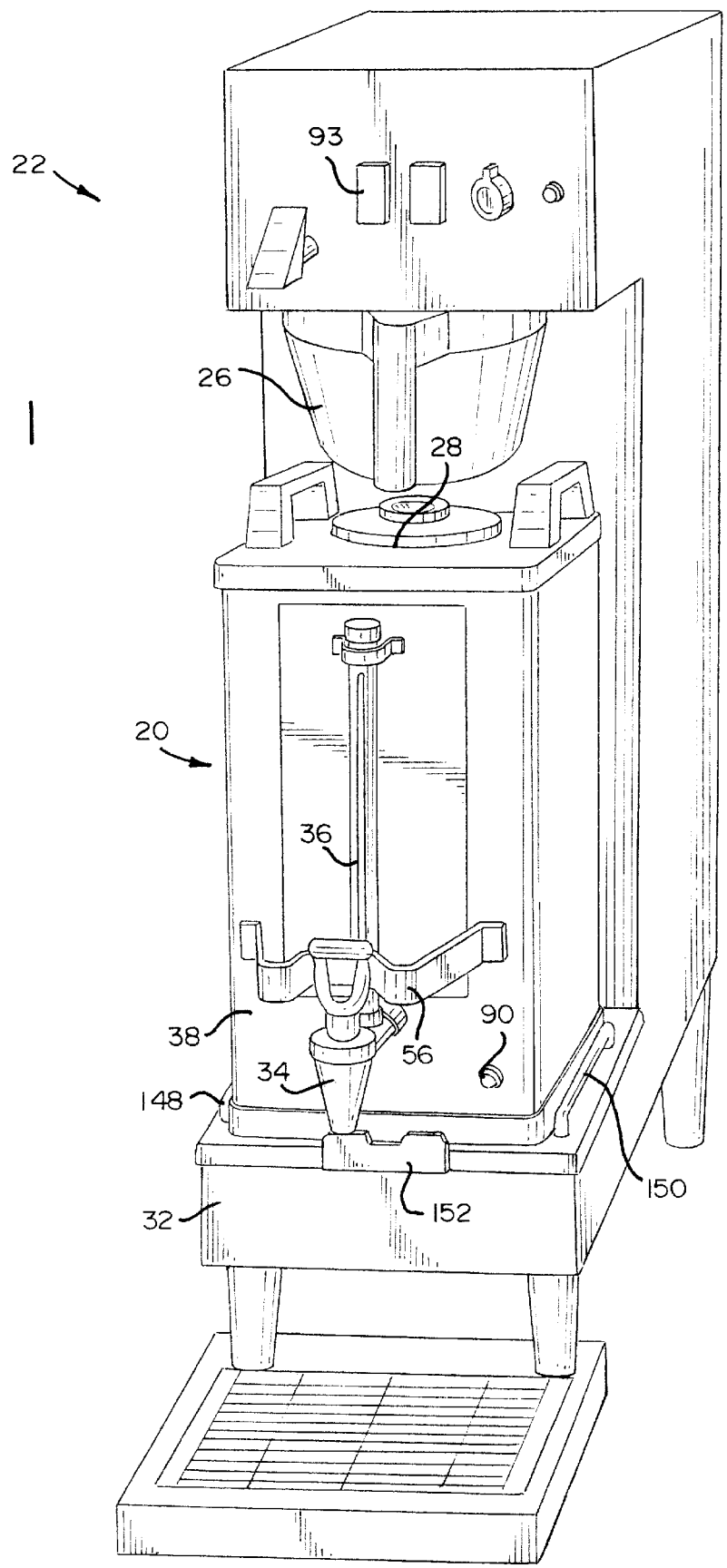
FIG. 1 is a perspective view of a coffee server of the present invention positioned at a brewing apparatus which facilitates brewing of a coffee beverage or other infusion type brewed beverage directly into the server.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 2:
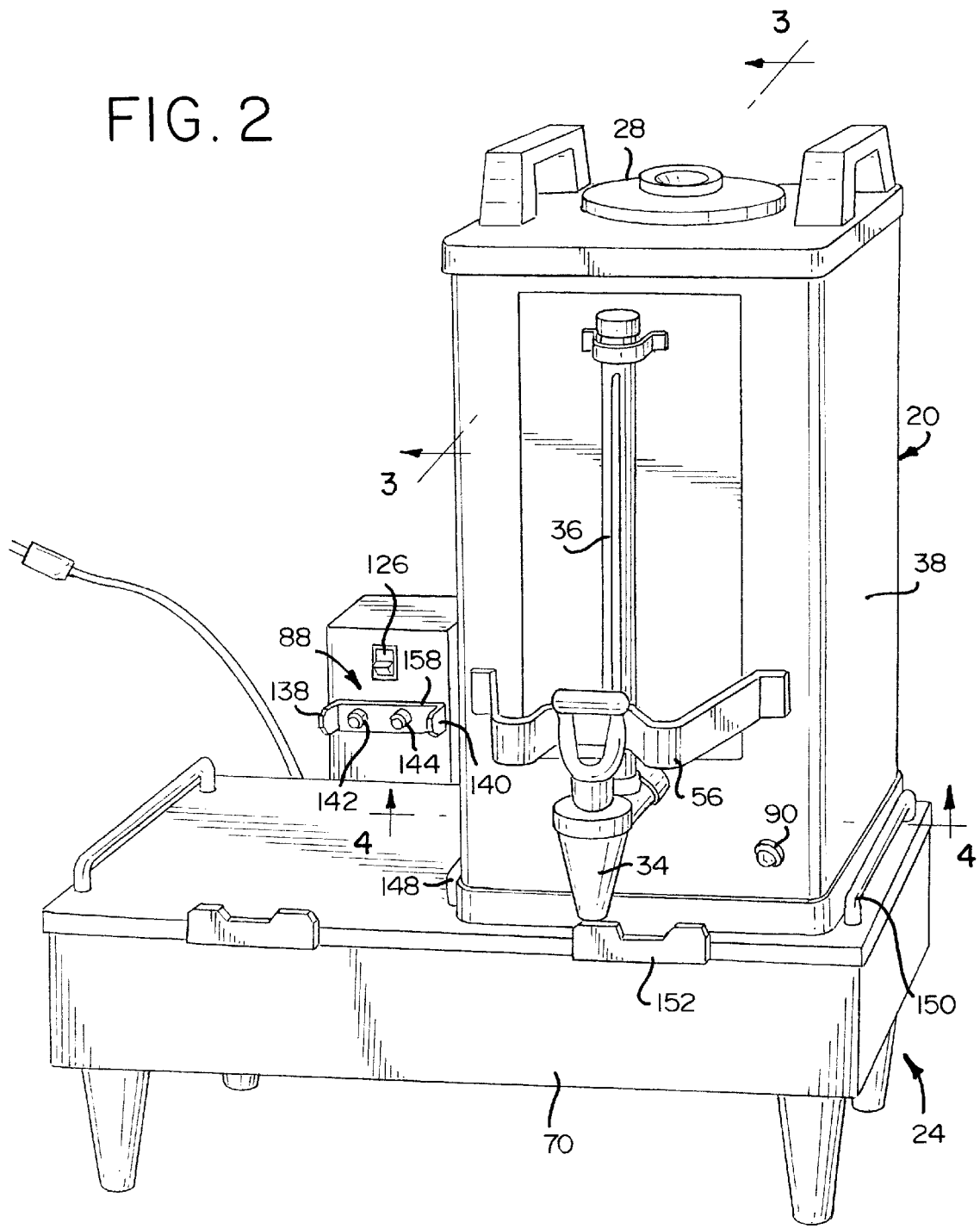
FIG. 2 is a perspective view of a server of the present invention positioned at a server power station of the present invention.

The present invention includes a beverage server 20, as described in greater detail hereinbelow either singularly or in combination with a brewer 22 as shown in FIG. 1, as well as a server power station 24 as shown in FIG. 2. The present invention also includes systems and structures which may used with a variety of servers 20.

As shown in FIG. 1, a server 20 is positioned in a brewer 22 so that a brewed beverage may be dispensed directly from a brewing funnel 26 through a brew through lid 28 attached to the server 20 and into a reservoir 30 (see, FIG. 3) retained inside the server 20. The brew-through lid 28 is of a known construction as set forth in U.S. Pat. Nos. 4,739,898, issued Apr. 26, 1988 to Brown; and 5,480,054, issued Jan. 2, 1996 to Midden, as incorporated herein by reference. As shown in FIG. 1, the server 20 is positioned on a base 32 of the brewer 22. The base is an unheated support to position the server 20 beneath the brewing funnel 26. As will be discussed in greater detail hereinbelow, the server 20 may be provided with a warming system which will maintain the temperature of the beverage retained in the reservoir 30 of the server 20 thereby eliminating the need for a warming element on the brewer 22.

With further reference to FIG. 2, the server 20 is shown positioned on the server power station 24. The provision of power from the server power station 24 will be described in detail hereinbelow. The server 20 as shown on the power station 24 is of the type as shown in FIG. 1 which includes the brew-through lid 28. It should be noted, however, that the server 20 also may be filled with a desired quantity of a desired beverage and a lid attached thereto. The server 20 does not require that a brew-through lid 28 be used but it should be understood by one of ordinary skill in the art that a variety of lids may be used with a server in order to close a top filling mouth of the server. With reference to both FIGS. 1 and 2, the server 20 includes a faucet 34 positioned on a front surface thereof which is connected to a reservoir 30 (see, FIG. 3). A sight gauge 36 is also coupled to the faucet 34 for viewing the approximate level of the beverage in the reservoir.

Figure 3:
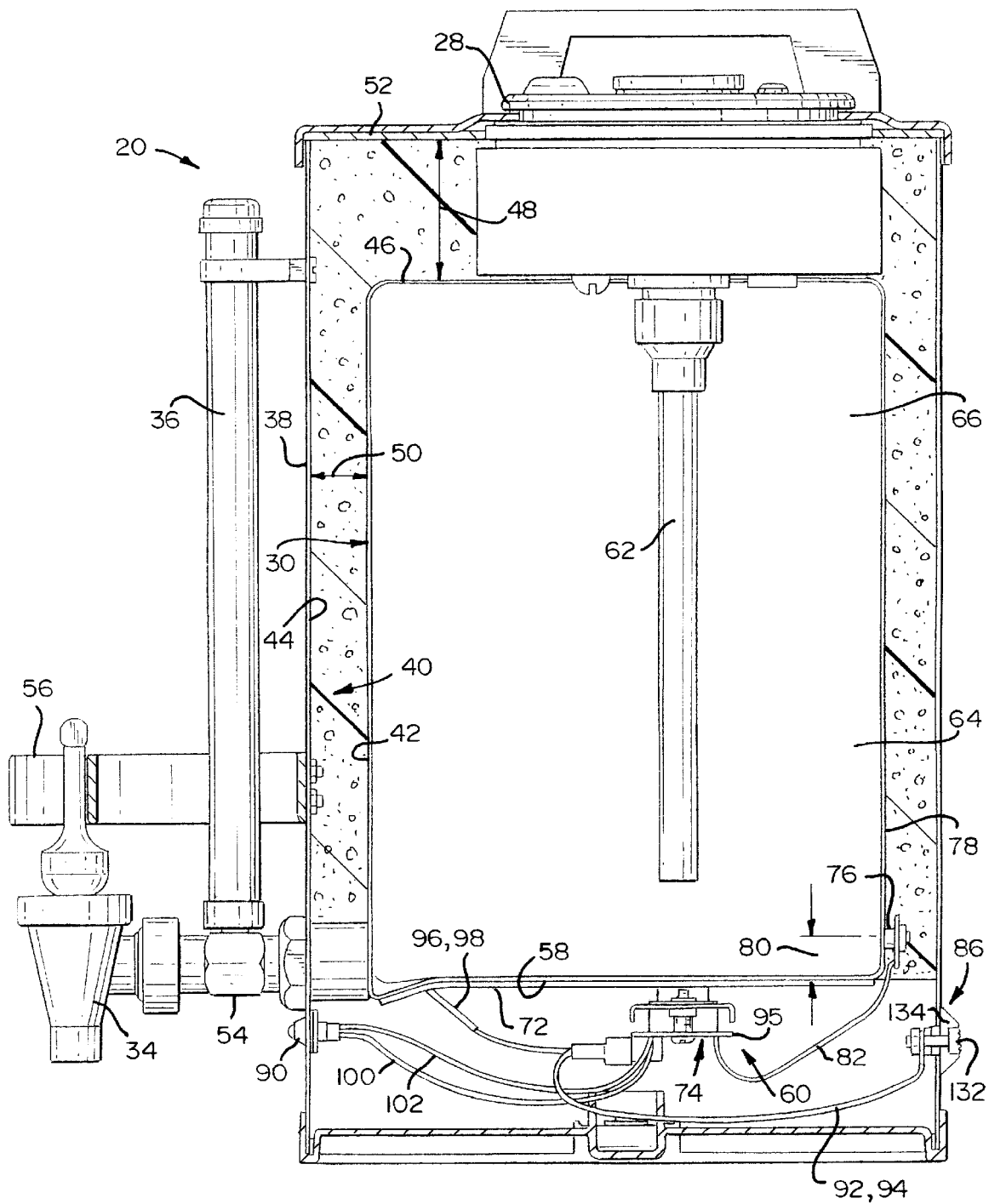
FIG. 3 is a cross-sectional, side elevational view of the server taken along line 3—3 in FIG. 2.
Figure 4:
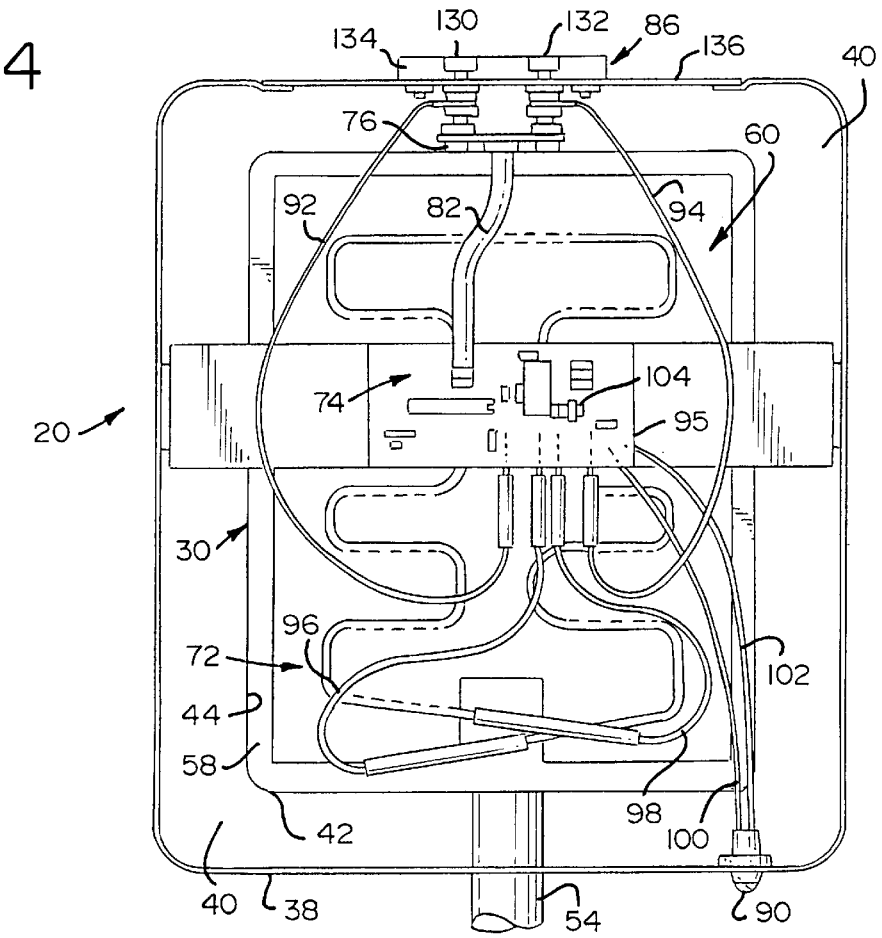
FIG. 4 is a bottom plan view taken along line 4—4 in FIG. 2.
Figure 5:
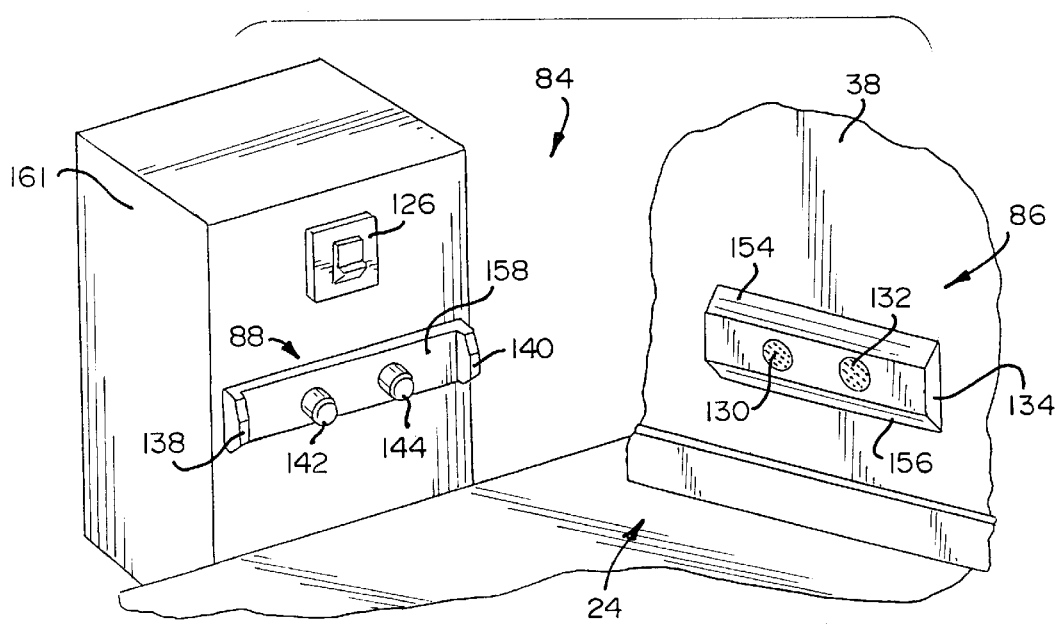
FIG. 5 is a perspective view of a rear surface of a server showing a server power contact positioned to show the relative placement thereof to a power station contact on a server power station.

Having now briefly described the overall external structures of the server 20, we turn to the internal structure and function of the server 20 as shown in FIGS. 3 and 4. As shown in FIG. 3, the reservoir 30 is retained within a housing 38. Insulation material 40 is positioned between an outside surface 42 of the reservoir 30 and an inside surface 44 of the housing 38. The insulation 40 as shown is a polyurethane expanded foam insulation, although one of ordinary skill in the art will be able to choose from a variety of insulation materials suitable for a desired set of conditions.

Insulation 40 is positioned not only between the generally vertically aligned walls of the reservoir 30 and the housing 38 but also over a top surface 46 of the reservoir 30. Insulation 40 in the area above the reservoir 30 has a thickness dimension 48 which is generally greater than a thickness dimension 50 of the sidewalls. The offset of the top 46 from a top 52 of the housing allows a greater insulating effect to retain heat rising within the reservoir. As a result of the additional insulation thickness 48, heat is prevented from escaping and is retained within the beverage retained within the reservoir. It should be noted that thickness is used in the above description to describe heat retaining characteristics. If a thin high heat retention insulation is used above the reservoir, it may be thinner than a different insulation having a lower heat retention characteristic used in the walls.

As an additional way to prevent heat loss through heat conduction, the faucet 34, a connecting assembly of tubes 54 connecting the faucet 34 to the reservoir 30 and the sight gauge 36 all may be produced of a plastic material. The plastic material helps to further minimize the conduction of heat and temperature loss to the beverage retained therein. A faucet guard 56, which also serves as a carrying support, is attached to the housing 38 and not to the reservoir so as to further prevent conduction of heat from the reservoir through various structure associated with the server 20.

While insulation may be provided to cover a bottom portion 58 of the reservoir 30, in the embodiment as shown in FIG. 3, a heating assembly 60 as described in greater detail hereinbelow, provides heat to the bottom 58. As such, insulation is generally not necessary although may be provided to further retain heat within the reservoir 30.

A fill tube 62 is attached to the brew-through lid 28. The fill tube 62 extends downwardly through the reservoir 30 so that beverage dispensed from a brewer through the lid 28 will be delivered in a lower portion 64 of the reservoir. By dispensing the beverage through the fill tube 62 into the lower portion 64, the addition of additional fresh beverage to the pre-existing beverage retained within the reservoir will be mixed with the existing beverage. By mixing newly added beverage with existing beverage, the flavors in the two beverages are forced to mix and are prevented from stratifying. Additionally, the fill tube 62 counteracts and prevents temperature stratification. Fresh heated beverage which is introduced into the reservoir may be at a slightly higher temperature than the beverage retained in the reservoir. The introduction of a higher temperature beverage in the lower portion 64 of the reservoir 30 forces mixing because the higher temperature beverage will tend to migrate upwardly towards an upper portion 66 of the reservoir 30. However, when the beverage is dispensed into the lower portion 64, it is required to mix with the existing beverage thereby preventing temperature stratification.

The present invention includes the heating assembly 60 which provides thermostatically controlled heat to the beverage retained in the reservoir 30. The heating assembly 60 is powered by a power delivery system 68 as shown diagrammatically in FIG. 8 and variously shown in terms of structures in FIGS. 2–7. The heating assembly 60 is coupled to and receives power from the server power station 24. It should be noted that the power delivery system 68 as diagrammatically shown in FIG. 8 and as more specifically shown in the server power station of FIGS. 2, 5–7, may also be provided in conjunction with the brewer 22 as shown in FIG. 1. The brewer may be provided with the power delivery system 68 so that the server 20 is energized at the brewer 22. It should also be noted, that the power delivery system 68 as shown and described herein in greater detail can also be incorporated into a counter surface serving station and does not necessarily require the separate base structure 70 as shown in FIG. 2.

With the foregoing in mind, we now turn to FIGS. 3 and 4 to describe the heating assembly 60 disposed on the server 20. The heating assembly 60 includes a heating element or heating coil 72 which is attached to the bottom 58 of the reservoir 30. The heating coil 72 is in the form of a blanket heater of known construction. The heating coil 72 is positioned against the bottom 58 of the reservoir 30 so as to conduct heat through the reservoir wall to the beverage retained therein. It is advantageous to position the heater 72 on the bottom so that the heat rises through the reservoir as a result of convective action. Additionally, the insulation material 40 in the side walls of the server 20 help to retain the heat within the beverage in the reservoir.

A control circuit 74 is provided to control the operation of the heater 72. The control circuit 74 is coupled to a thermostatic sensor or thermostat 76. The thermostatic sensor 76 is positioned on a side wall 78 of the reservoir 30, a dimension 80 above the bottom of the reservoir 30. In this regard, spacing of the thermostat 76 away from the bottom a distance 80 prevents sensing the heater 72. Rather, the thermostat 76 senses the temperature of the beverage retained in the reservoir which comes in contact with the side walls 78 thereby providing a more accurate reading of the contents of the reservoir. Spacing the thermostat 76 too far towards the top would prevent sensing the beverage temperature when the reservoir is depleted and also may result in an inaccurate and somewhat cooler or lower sensed temperature.

The thermostat 76 is coupled to the control circuit 74 via control line 82. When the beverage temperature drops below a predetermined preset level, the heater 72 is activated until the beverage temperature is raised to an upper value of a desired preset temperature range. It should be noted that the beverage temperature range may be programmed so that a desired beverage temperature may be maintained within the reservoir. When the reservoir is filled, heating of the beverage in the lower portion 64 tends to create convective currents within the beverage which tends to cause the beverage to migrate from the lower portion upwardly to the upper portion 66. As the beverage temperature decreases in the upper portion, the beverage tends to sink or migrate downwardly and once again be heated.

When the level of the beverage in the reservoir drops to the level generally only filling the lower portion 64, the upper portion will be occupied by air. Even though the temperature of the air in the upper portion 66 may rise above the desired temperature range, the temperature of the beverage in the lower portion 64 will be maintained within the desired range as a result of positioning the thermostat 76 in the lower portion. Regulation of temperature using the thermostatic sensor 76 and the control circuit 74 prevent overheating of the reservoir even if the reservoir 30 is drained of beverage. In this regard, the thermostat 76 will continue to sense the temperature of the reservoir cavity which, under the present scenario, when the heater is activated, it will heat until the upper level of the desired temperature range is achieved. Once achieved, the thermostat 76 will sense the temperature increase in the upper portion 66 and the control circuit 76 will deactivate the heater 72. As such, the heating assembly 60 of the present invention provides a fail safe mechanism which prevents overheating of the server 20.

The server 20 in conjunction with the heating assembly 60 of the present invention also acts to preheat the server 20. As discussed in the Background section, it is desirable to preheat a server 20 so that beverage placed in the reservoir 30 does not appreciably decrease in temperature. As such, an empty server 20 can be coupled to the power delivery system 68 for preheating the reservoir 30. If the reservoir 30 is empty, the air within the reservoir will be heated, which accordingly, will heat the structure of the reservoir and the surrounding insulation material. The preheating will prevent sinking of heat from a beverage subsequently deposited therein. As such, a server 20 can be preheated, filled with a beverage, and immediately placed for use without having to wait for the temperature of the beverage to rise to a desired serving temperature range after being deposited in the reservoir 30.

The power delivery system 68 as shown in FIG. 8 includes a contact assembly 84 which includes a server power contact 86 and a power station contact 88. The server power contact 86 and power station contact 88 are brought into engagement (see, FIGS. 6 and 7) to provide a conductive coupling to transmit power to the control circuit 74 and the heater 72.

In addition to controlling the temperature of the beverage in the reservoir 30, the control circuit 74 also includes a programmable timer for monitoring the time beverage is retained in the reservoir. When a server 20 is placed on a power station 24, the server power contact 86 is coupled to the power station contact 88 thereby resetting the timer within the control circuit 74. An indicator device 90 such as an LED is provided on the server 20. The indicator 90 is initially illuminated as a result of the coupling of the contacts 86,88. After a predetermined, programmable "time-out", the indicator 90 will begin to flash. This will indicate that the serving life of the beverage retained in the reservoir has achieved its predetermined maximum. The flashing indicator 90 will signal to the food preparation employee that the beverage needs to be drained from the reservoir 30 and fresh beverage dispensed therein.

The circuit 74 can also be modified for use with the brewer 22 as shown in FIG. 1 such that a relay 91 is connected to the control circuit 74 and a start switch 93 of the brewer 22. Once the start switch 93 is activated, it will momentarily break power to the control circuit 74 thereby resetting the timer. This type of circuit is useful when the server 20 is to be maintained at the brewer 22. In this regard, once the quantity of beverage in the reservoir 30 drops to a level where additional beverage is required, the brew or start switch 93 is activated to initiate a new brewing cycle thereby dispensing beverage through the filter 26 and lid 28, via the fill tube 62, into the reservoir 30. The activation of the start switch 93 will initiate the timer for a new period of time associated with the new quantity of beverage dispensed therein.

The control circuit 74 is shown herein in the form of a circuit board 95. A thermostat 76 is coupled to the circuit board via a line in the form of a ribbon cable 82. The power is provided from the server power contact 86 by the power lines 92,94. The heater 72 is coupled to the circuit board by lines 96,98 and the indicator 90 is coupled to the circuit board by lines 100,102. Moveable mechanical jumpers 104 of a known construction are provided on the circuit board so as to program a desired hold time for retaining the beverage in the reservoir 30. The jumper connection 104 may be moved in order to achieve a desired hold time for the beverage. Alternatively, a lead may be provided on the circuit board for each of the desired hold times whereupon cutting and severing of the lead will produce the desired hold time time-out period.

As briefly discussed herein and as shown in FIGS. 2–8, the present invention includes the power delivery system 68 in order to provide safe, control power to the server 20. It should be noted that the present discussion pertains to a two-station server and that other, multiples may be used as well as a single station server. The power delivery system 68 is generally shown in the diagram of FIG. 8. The power delivery system 68 is connected to a power source by way of a power source connection or plug 110. An incoming line 112 is connected to a corresponding transformer 116. The transformer 116 is provided to transform the incoming power to a lower voltage thereby making it safer for presentation to customers.

In particular, the transformer 116 of the preferred embodiment of the present invention brings the power down to 72 watts at 24 volts. This power level is considered safe to touch in accordance with Underwriter Laboratory standard maximum threshold of which is 42 volts. A manually resettable 4 amp circuit breaker 124 is provided on the line to prevent any potential problem in the event that the power station contact 88 is shorted.

A full wave bridge rectifier 126 is coupled to the line. As shown in FIG. 8, the diagrammatic view of the server 20 is positioned for coupling the server power contact 86 with the corresponding power station contact 88. When the contacts 86,88 are coupled, power is provided to the heating assembly 60. The transformer 116 is retained in the base 70 of the server power station 24 or a base 32 of the brewer 22. Additionally, the transformer 116 and bridge 126 may also be retained in an equipment space provided in a permanent countertop-type installation.

Turning now to the structure and function of the contact assembly 84, it can be seen that the server contact 86 includes a pair of contact pads 130,132 retained in an insulated protruding strip 134. The protruding strip 134 is positioned on a rear side 136 of the server 20 at a position for engagement with the power station contact 88. The power station 88 includes a pair of opposed side guides 138,140. Inwardly of the side guides 138,140 are positioned a pair of spring-loaded contact plungers 142,144 which are positioned for conductive coupling with the contact pads 130,132.

With reference to FIGS. 6 and 7, it can be seen that an inside surface 136 of the opposed side guides 138,140 are spaced apart to permit passage of the protruding strip 134 therebetween. As shown in FIGS. 1 and 2, a pair of opposed guides 148,150 and a front guide 152 are provided for positioning the server 20 relative to the power station contact 88. When positioned within the area defined by the side rails 148,150, front guide 152 and power station contact 88, the server power contact 86 is directed into engagement with the power station contact 88. Sloped sides 154,156 of the protruding strip 134 prevent the accumulation of food, dust and dirt on the server power contact 86 and promote engagement with the power station contact 88. The side guides 138,140 protrude from a base portion 158 so as to shield the plungers 142,144 and prevent contact with the surface 136 of the server housing 38. This is particularly desirable in the situation where the server housing 38 is formed of a metallic material. As such, the side guides 138,140 prevent shorting of the plunger contacts 142,144 against this surface.

With further reference to FIGS. 6 and 7, a partial fragmentary view of the plunger contact 142 is provided. As shown, an insulating body 160 is attached to the housing structure 160. A bore 162 is provided in the insulating body and a spring 164 is retained within the bore 162. The plunger includes a shaft portion 166 and a head portion 168. The head 168 has a greater diameter than the shaft 166 thereby retaining the spring 164 within the bore 162. Spring loading of the plunger contacts 142,144 assures that there will be a positive engagement against the contact pads 130,132. Additionally, a waffled or raised surface 170 is provided on the face of the contact pads 130,132. This also assures positive contact with the plunger head 168.

Figure 9:
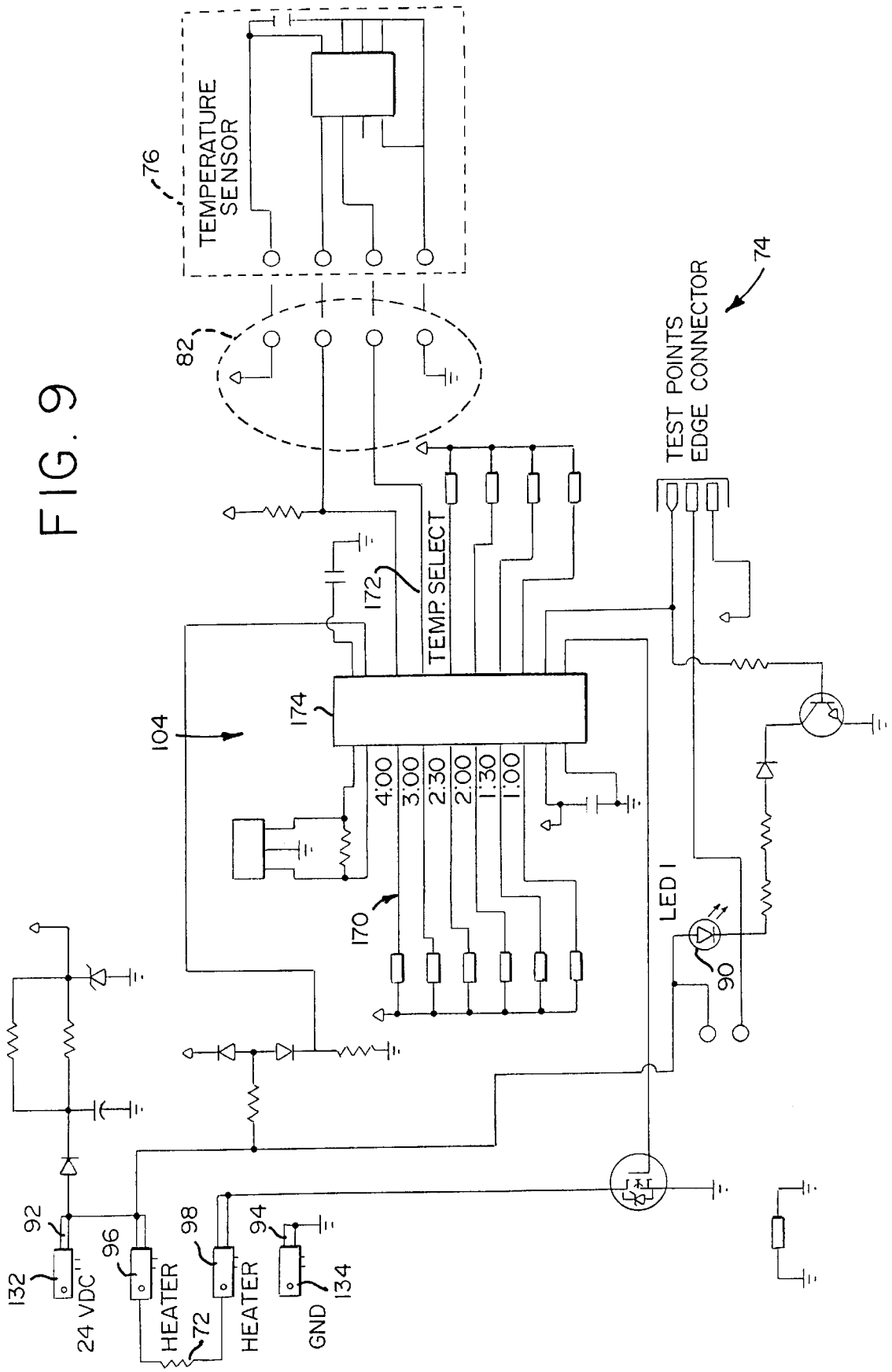
FIG. 9 is a schematic of the circuit associated with the server to facilitate controlled energization of a heating element coupled to the server.

Turning now to FIG. 9, the schematic for the control circuit is reviewed. As shown, the control circuit 74 as shown in FIG. 9 includes the temperature sensor 76 coupled to the circuit board via lines 82. Lines 92,94 connect the power station 24 to the server 20 at contact pads 132,134. The heater 72 is coupled to lines 96,98. The jumpers 104 are shown in greater detail in FIG. 9. The jumpers 104 include jumpers 170 for programming the hold time of the beverage in the reservoir 30 and jumpers 172 for programming the desired hold temperature. The control circuit includes a processor 174 connected to the jumpers 170,172. Respective jumpers 170,172 can be clipped to achieve the desired programming results. Alternatively, moveable mechanical jumper connectors may be used to achieve the desired programming results.

While a preferred embodiment of the present invention is shown and described, it is envisioned that those skilled in the art may devise various modifications and equivalents without departing from the spirit and scope of the invention. The invention is not intended to be limited by the foregoing disclosure.

We claim:

1. A beverage server coupled with a power source for providing power to electrical components of said beverage server, said beverage server and power source comprising:
   a housing;
   a reservoir retained within said housing;
   a heating element retained in said server for providing heat energy to said beverage retained in said reservoir;
   a server power contact positioned on said housing and coupled to said heating element; and
   a power station contact retained on said power source and positioned for conductive coupling with said server power contact to transfer power from said power source to said heating element of said server.

2. A beverage server coupled with a power source as recited in claim 1, further comprising guide structures on at least one of said power station contacts and said server power contact to promote engagement of said contacts when said server is positioned in proximity to said power source.

3. A beverage server coupled with a power source as recited in claim 2, said guide structure, further comprising protruding side guides proximate to said power station contact, said server power contact being sized and dimensioned to fit between said side guides, said side guides being positioned at said power source to prevent contact by any structure other than said server power contact.

4. A server coupled with a power source as recited in claim 2, at least one of said power station contact and said server power contact having a spring biased assembly to promote extension of a moveable contact component toward the opposing contact structure, said spring loaded contact component promoting positive conductive engagement of the contacts when said server is positioned at said power source.

5. A beverage server coupled with a power source, as recited in claim 1, further comprising an electrical transformer coupled with said power source to provide low voltage power at said power station contact, said power station contact having low voltage power to provide a presentation of power.

6. A beverage server coupled with a power source as recited in claim 1, further comprising a circuit having a timer, said server being selectively coupled to said power source, said timer being reset upon at least one of said engagement and disengagement of said server with said power source, an indicator coupled to said timer which is activated upon the expiration of a predetermined period of time after resetting said timer and coupling of said server to said power source so as to indicate the expiration of beverage retained within the server.

7. A beverage server coupled with a power source as recited in claim 1, further comprising:

insulation positioned between an upper surface of said reservoir and a corresponding surface of said housing having a greater heat retaining characteristic than corresponding insulation positioned between side walls of said reservoir and said housing.

8. A beverage server coupled with a power source as recited in claim 1, said heating element positioned on an outside surface of said reservoir for heating the beverage retained therein, said heating element being positioned on a bottom surface of said reservoir for conducting heat into and upwardly through said beverage retained therein.

9. A beverage server coupled with a power source as recited in claim 1, further comprising a temperature sensor positioned on a side wall of said reservoir adjacent said heating element, said temperature sensor being spaced from said heating element to prevent sensing of said heating element and promoting sensing of a beverage retained in said reservoir.

10. A beverage server coupled with a power source as recited in claim 1, further comprising a faucet attached to and extending through said housing communicating with said reservoir for dispensing a beverage from said reservoir.

11. A beverage server coupled with a power source as recited in claim 10, further comprising said faucet being formed of a material having a low heat conducting characteristic to prevent loss of heat through said faucet communicating with said beverage.

12. A beverage server coupled with a power source as recited in claim 10, further comprising:
a fill opening in an upper portion of said reservoir for dispensing beverage into said reservoir; and
a fill tube associated with said opening, said fill tube extending downwardly through said reservoir toward a bottom portion of said reservoir, said fill tube promoting mixing of flavors and preventing stratification of beverage temperature in said reservoir.

13. A beverage server coupled with a power source as recited in claim 1, further comprising a handle attached to an outside surface of said housing for carrying said server, insulation being positioned between an attachment portion of said handle and said reservoir for preventing conduction of heat from said reservoir to said handle.

14. A beverage server in combination with a power source for providing power to electrical components of said beverage server, said beverage server and power source comprising a housing;
a reservoir retained within said housing;
a faucet attached to said housing and communicating with said reservoir for dispensing a beverage from said reservoir;
a heating element retained in said server positioned on an outside surface of said reservoir for heating the beverage retained therein;
a server power contact positioned on said housing and coupled to said heating element;
insulation positioned between said reservoir and said housing;
a circuit having a timer, said server being selectively coupled to said power source, said timer being reset upon at least one of said engagement and disengagement of said server with said power source, an indicator coupled to said timer and which is activated upon expiration of a predetermined period of time after resetting the timer and coupling of said server to said power source so as to indicate the expiration of beverage retained within the server;
a server power contact positioned on said housing and coupled to said heating element; and
a power station contact retained on said power station and positioned for conductive coupling with said server power station transfer power from said power source to said heating element of said server.

15. A beverage server in combination with a power source as recited in claim 14, wherein said heating element being positioned on a bottom surface of said reservoir for conducting heat into and upwardly through said beverage retained therein.

16. A beverage server in combination with a power source as recited in claim 14, said insulation being positioned between an upper surface of said reservoir and a corresponding surface of said housing having a greater heat retaining characteristic than a corresponding insulation being positioned between side walls of said reservoir and said housing.

17. A beverage server in combination with a power source as recited in claim 14, further comprising said faucet being formed of a material having a low heat conducting characteristic to prevent loss of heat through said faucet communicating with said beverage.

18. A beverage server in combination with a power source as recited in claim 14, further comprising a fill opening in an upper portion of said reservoir for dispensing beverage into said reservoir; and a fill tube associated with said opening, said fill tube extending downwardly through said reservoir toward a bottom portion of said reservoir, said fill tube promoting mixing of flavors and preventing stratification of beverage temperature in said reservoir.

19. A beverage server in combination with a power source as recited in claim 14, further comprising a temperature sensor positioned on a wall of said reservoir adjacent said heating element, said temperature sensor being spaced from said heating element to prevent sensing of said heating element and promoting sensing of a beverage retained in said reservoir.

20. A beverage server in combination with a power source as recited in claim 14, further comprising guide structures on at least one of said power station contacts and said server power contact to promote engagement of said contacts when said server is positioned in proximity to said power source.

21. A beverage server in combination with a power source, as recited in claim 20, further comprising an electrical transformer coupled with said power source to provide low voltage power at said power station contact, said power station contact having low voltage power to provide a presentation of power.

22. A beverage server in combination with a power source as recited in claim 20, said guide structure, further comprising protruding side guides proximate to said power station contact, said server power contact being sized and dimensioned to fit between said side guides, said side guides being positioned at said power source to prevent contact by any structure other than said server power contact.

23. A server in combination with a power source as recited in claim 2, at least one of said power station contact and said server power contact having a spring biased assembly to promote extension of a moveable contact component toward the opposing contact structure, said spring loaded contact component promoting positive conductive engagement of the contacts when said server is positioned at said power source.

* * * * *

UNITED STATES PATENT AND TRADEMARK OFFICE
CERTIFICATE OF CORRECTION

PATENT NO. : 6,089,409
DATED : July 18, 2000
INVENTOR(S) : Burton L. Hart and John T. Knepler It is certified that error appears in the above-identified patent and that said Letters Patent is hereby corrected as shown below:

Column 7, Line 52 "the housing structure 160" should be
-- the housing structure 161 --

Signed and Sealed this

Seventeenth Day of April, 2001

Attest:

NICHOLAS P. GODICI

Attesting Officer   Acting Director of the United States Patent and Trademark Office